1,954,783

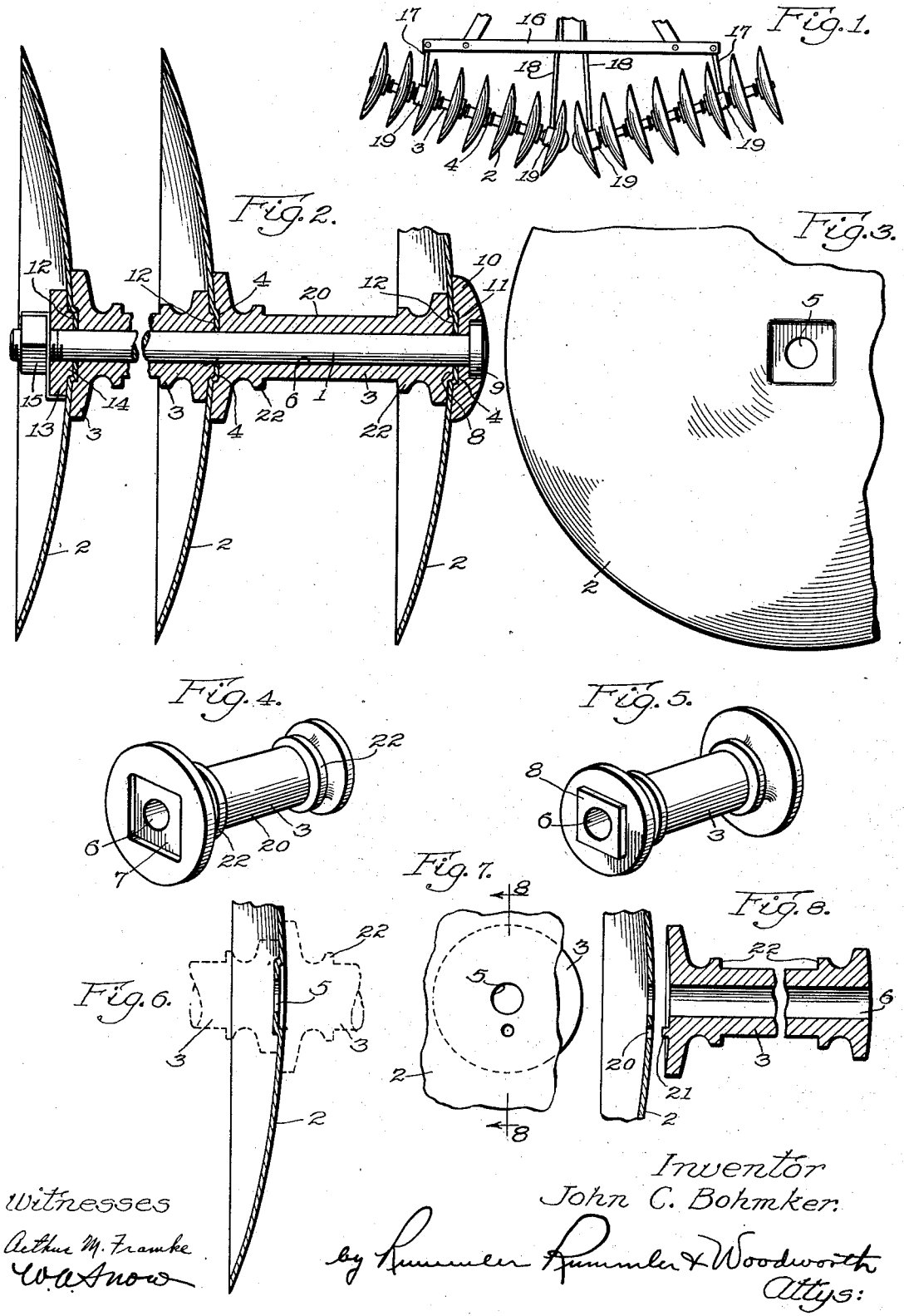
April 17, 1934.   J. C. BOHMKER   1,954,783
DISK BLADE
Filed Dec. 22, 1932
Inventor
John C. Bohmker Patented Apr. 17, 1934

UNITED STATES PATENT OFFICE 1,954,783

DISK BLADE

John C. Bohmker, Kankakee, Ill.

Application December 22, 1932, Serial No. 648,449

12 Claims. (Cl. 97—220)

This invention relates to improvements in disk harrows and disk plows, and more particularly to the method of driving the disk blades.

In the present state of the art, disk blades are concave in shape and are made with a substantially square central shaft aperture. The disks are threaded on a square shaft so that the shaft will drive the disks. Spools are interposed between the disks for spacing purposes. By making the disk harrows and plows in this manner, experience has proved that the disks cut into and wear down the corners of the square shaft, thereby causing the disk to become loose and ill-fitting, and the driving strain causes the disk to crack radially from one or more of the corners of the central square aperture.

The main objects of my invention are to provide disk blades with a central round aperture adapted to be placed on a round shaft; to provide coacting driving means between the disks and the spools; to provide a construction in which the disks are driven by the spools; to provide a round shaft adapted to receive round apertured spools and round apertured disks; to provide an improved assembly of disks, spool spacers, on a shaft; to provide a shaft of less weight, but of equal or greater strength; to provide a spool which will turn on a shaft and which may or may not be used as a bearing to support the frame of the machine of which it forms a part.

An illustrative embodiment of my invention is shown in the accompanying drawing in which:

Figure 1 is a top plan view of the device in which disk blades are used.

Fig. 2 is a fragmental sectional view of the disk and spools showing the round shaft construction.

Fig. 3 is a fragmental face view of the convex side of the disk.

Fig. 4 is a perspective view showing the recessed end of the spool.

Fig. 5 is a perspective view of the bossed end of the spool.

Fig. 6 is a modified form of disk and spool.

Fig. 7 is a further modified form of spool and disk.

Fig. 8 is a section on the line 8—8 of Fig. 7.

In the preferred embodiment of the present invention a plurality of dished disks are provided with squared bosses on the concave sides of the disks and are each provided with a round central aperture for placement on a round shaft or tie rod. Interposed between the disks are spacer spools, one end of each being provided with a recess and the other end being provided with a boss for coaction with the disks.

Referring more in detail to the preferred embodiment, a disk harrow, disk plow or the like, is provided with the usual draw bar and bracing means, and the rotating unit comprises a round shaft or tie rod 1, a plurality of dished disks 2, and spacer spools 3. The disk 2 is provided with a square protrusion 4 extending on the concave side of the disk and a central round aperture 5. The spacer spool 3 is provided with a central round aperture 6 having a squared recess 7 on one end as shown in Fig. 4, and a squared boss 8 on the other end.

Referring to Fig. 2, in the assembly of disks for attachment to a harrow or plow, one end of the shaft 1 has a head 9 which is seated in a special washer 10, having a recess 11 which fits over the protrusion 4 on the disk 2. After the special washer 10 and a disk 2 have been threaded on the bolt shaft 1, a spool spacer 3 follows with the boss 8 contacting with the disk 3.

In the same manner, additional disks and spacers are placed on the shaft until the shaft has taken on the required number of disks. A special washer 13 having a boss 14 is then placed on the shaft and interfits into the recessed end 12 of the protrusion 4 of the disk. A nut 15 is then screwed onto the end of the shaft or tie rod 1 and is tightened, thereby causing the complete assembly to be clamped in a rigid structure so that all the assembled parts will move together.

The complete assembly is then attached to the frame work 16 of the harrow or plow by means of the usual arms 17 and 18 and journal 19. The journal 19 rides on one of the spools 3 and the surface 20 thereby acts as a bearing for the clamp, and the collars 22 function as thrust bearings.

Referring to the embodiment shown in Fig. 6, the protrusion 4 of the disk 2 is the reverse of the preferred embodiment and extends into the convex side of the disk instead of on the concave side, and the end spacer spools are also reversed so that the recessed end of the spool in the preferred embodiment will be formed with a boss and the other end with the recess.

Referring to Figs. 7 and 8, the disk is provided with an off centered aperture 20 and the spacer spool is provided at one end only with a lug 21 so that when the assembled apparatus is drawn up by the tie rod or shaft, the lug fits in the aperture 20 and the disk is driven by the spool.

It can be readily understood that the shape of the protrusion 4 on the disk, the boss and the recess of the spacer spool, can be formed in any shape from the square to the rectangle, the triangle, and through the various adaptations of the polygon.

The advantages obtained by applicant's invention over former constructions, is the change from the short radius shaft drive near the center of the disk to a spool drive through a clamped contact which increases the radius of drive on the disk, thereby reducing the liability to radial crack. The illustrative square protrusion forms a drive away from the center of the disk blade, which substantially eliminates the strains on the blade found in former assemblies.

By using a round shaft, the shaft can be made of three-quarter inch or less stock, thereby presenting a saving of material of from 35 to 50%, as the universal size of the square shafts is now seven-eighths inch. There is a further advantage in the use of a round shaft in that it can readily be threaded for receiving a nut, whereas, with the square shaft, it is necessary to turn the end of the shaft round so that threads may be cut thereon.

A further advantage of the construction is that heretofore the spacer spools had the sole function of correctly spacing the disks, whereas, in the present construction, the spools also drive the disks.

Although several specific embodiments of the invention have been shown and described, it is to be understood that numerous details of the construction shown may be altered or omitted without departing from the spirit of the invention as defined by the following claims.

I claim:

1. In disk blade apparatus, spool spacers each having apertures, disk blades each having apertures, a warped surface on each of said disk blades, one end of each of said spools coacting with and enveloping the concave side of the warped surface on each of said disk blades, the other end of each of said spools coacting with and enveloping the warped surface on the convex side of each of said disk blades and means for clamping said blades for driving said disks and spacers.

2. In a disk blade apparatus, a shaft, spool spacers on said shaft and each having central apertures, disk blades on said shaft and each having a central aperture therein, a warped surface on each of said disk blades, one end of each of said spools formed to coact with and envelop the warped surface on the concave side of each of said disk blades, the other end of each of said spools formed to coact with and envelope the warped surface on the convex end of each of said disk blades and means for clamping said blades and spacers on said shaft.

3. In disk blade apparatus, spool spacers each having round apertures, disk blades each having a round aperture, a warped surface on each of said disk blades, one end of each of said spools formed to coact with and envelope the warped surface on the concave side of each of said disk blades, the other end of each of said spools formed to coact with and envelope the warped surface on the convex side of each of said disk blades, and a tie bolt shaft on which said spools and blades are threaded for clamping said spools and blades together.

4. In a disk blade apparatus, a disk blade having a round aperture at its center and a warped surface adjacent said aperture, spools having round apertures and adapted to coact with and envelope said warped surfaces whereby relative motion between said disk blade and said spools is prevented when clamped in coacting relation.

5. In a disk blade apparatus, a disk blade having a central aperture and an irregular surface adjacent thereto, spacer spools having ends adapted to coact with and envelope said irregular surfaces, and a tie bolt for clamping said disk blade to said spacers.

6. In a disk blade machine, a concave disk blade, a deformation adjacent the center of said blade, spacer spools having concave and convex ends, the concave end on one of said spacer spools formed to fit the deformation on the convex side of said disk blade, the convex end on the other of said spools formed to fit the deformation on the concave side of said disk blade and means for clamping said spools and disk together.

7. In disk blade apparatus, a round shaft, disk blades on said shaft, protrusions on said disk blades, spacer spools on said shaft and interposed between said blades, and means on the ends of said spools for coaction with said blades and for enveloping said protrusions for interlocking and driving said blades.

8. In disk blade apparatus, a round shaft, disk blades on said shaft, protrusions on said disk blades, spacer spools on said shaft and interposed between said blades, means on the ends of said spools for coaction with said blades for interlocking and driving said blades, said means being arranged to envelope said protrusions, and thrust bearings intermediate said means on said spools.

9. In a disk blade apparatus, a round shaft, concave disk blades mounted on said shaft, a protrusion on the concaved side of said disk and forming a recess on the convex side, spacer spools mounted on said shaft and interposed between said blades, one end of each of said spools being indented for coaction with said protrusions on said disks, the other end of each of said spools being provided with bosses for coaction with the recesses on the convex sides of said disks, and means on said shaft for interlocking said blades and spools.

10. In a disk blade apparatus, a shaft, concave disk blades on said shaft, each of said disk blades being provided with an off-centered aperture, spacer spools mounted on said shaft and interposed between said blades, lugs on one end of each of said spools for coaction with said apertures in said disks and means on said shaft for interlocking said spools and disks.

11. In a disk blade apparatus, a round shaft, concave disk blades mounted on said shaft, a protrusion on the convexed side of said disk and forming a recess on the concave side, spacer spools mounted on said shaft and interposed between said blades, one end of each of said spools being indented for coaction with said protrusions on said disks, the other end of each of said spools being provided with bosses for coaction with the recesses on the concave sides of said disks, and means on said shaft for interlocking said blades and spools.

12. A discoidal cultivator plate of conoidal dished form having an axially struck-up square boss and having a round perforation disposed centrally of said plate and through said boss.

JOHN C. BOHMKER.